(12) United States Patent
Hayes et al.

(10) Patent No.: US 11,640,655 B2
(45) Date of Patent: May 2, 2023

(54) SYSTEMS AND METHODS FOR IMAGE TURBULENCE CORRECTION OF MOVING TARGETS

(71) Applicant: Raytheon Company, Waltham, MA (US)

(72) Inventors: Matthew John Francis Hayes, McKinney, TX (US); Dustin Hamill, McKinney, TX (US); James Robarge, McKinney, TX (US); Christopher Beardsley, McKinney, TX (US); Carl Magnuson, McKinney, TX (US)

(73) Assignee: RAYTHEON COMPANY, Waltham, MA (US)

( * ) Notice: Subject to any disclaimer, the term of this patent is extended or adjusted under 35 U.S.C. 154(b) by 148 days.

(21) Appl. No.: 17/230,621

(22) Filed: Apr. 14, 2021

(65) Prior Publication Data
US 2022/0335577 A1    Oct. 20, 2022

(51) Int. Cl.
*G06T 5/00*    (2006.01)
*G06T 7/246*    (2017.01)
(Continued)

(52) U.S. Cl.
CPC ............ *G06T 5/003* (2013.01); *G06T 3/4038* (2013.01); *G06T 7/246* (2017.01); *G01S 13/9021* (2019.05);
(Continued)

(58) Field of Classification Search
None
See application file for complete search history.

(56) References Cited

U.S. PATENT DOCUMENTS 8,019,170 B2  9/2011 Wang et al.
10,521,883 B1  12/2019 Hayes et al.
(Continued)

FOREIGN PATENT DOCUMENTS

CN    102663682 B    6/2015

OTHER PUBLICATIONS

Gao, Jing et al. "Atmospheric Turbulence Removal Using Convolutional Neural Network." Visual Information Laboratory, University of Bristol U.K. Dec. 22, 2019. Electrical Engineering and Systems Science; Image and Video Processing; arXiv:1912.11350.
(Continued)

*Primary Examiner* — Delomia L Gilliard
(74) *Attorney, Agent, or Firm* — Burns & Levinson, LLP; Joseph M. Maraia

(57) ABSTRACT

A system, and method of operating the same detects moving targets in images and performs image turbulence correction. The system includes an automatic target recognizer (ATR) system including a database. The ATR includes a feature extractor and processor arranged to detect a plurality of reference features associated with targets within image frames, and calculate a position of the plurality of reference features. The system includes an image processor arranged to receive the position, demosaic the image frames into a plurality of video tiles, iteratively process the video tiles for turbulence correction to generate turbulence corrected video tiles associated with acquired targets; convert the turbulence corrected video tiles into a single video frame tile including turbulence degradation correction; and mosaic each of the single video frame tiles to generate a full field of view turbulence corrected video stream.

16 Claims, 6 Drawing Sheets

(51) Int. Cl.
*G06T 3/40* (2006.01)
*G01S 13/90* (2006.01)
*G01S 17/89* (2020.01)

(52) U.S. Cl.
CPC ..... *G01S 17/89* (2013.01); *G06T 2207/10024* (2013.01); *G06T 2207/10048* (2013.01); *G06T 2207/20132* (2013.01); *G06T 2207/30196* (2013.01)

(56) References Cited

U.S. PATENT DOCUMENTS

| | | |
|---|---|---|
| 10,719,924 B2 | 7/2020 | Fluckiger et al. |
| 2009/0297059 A1* | 12/2009 | Lee ........................... G06T 5/50 382/275 |
| 2014/0340570 A1* | 11/2014 | Meyers ................... G06T 5/007 348/370 |
| 2018/0130191 A1* | 5/2018 | Fluckiger ................ G06T 5/001 |
| 2020/0167900 A1* | 5/2020 | Derndinger ............... G06T 5/10 |
| 2020/0327343 A1* | 10/2020 | Lund ........................ H04W 4/46 |
| 2021/0264569 A1* | 8/2021 | Wijk ........................ H04N 5/33 |

OTHER PUBLICATIONS

International Search Report and Written Opinion in Application No. PCT/US2021/065560 dated Oct. 5, 2022 (12 pgs.).

Petersen et al., "ATCOM: accelerated image processing for terrestrial long-range imaging through atmospheric effects", Proc. SPIE 8713, Airborne Intelligence, Surveillance, Reconnaissance (ISR) Systems and Applications X, 87130L (May 31, 2013); https://doi.org/10.1117/12.2018533 (10 pgs.).

* cited by examiner

SYSTEMS AND METHODS FOR IMAGE TURBULENCE CORRECTION OF MOVING TARGETS

GOVERNMENT LICENSE RIGHTS

This invention was made with government support with contract information withheld. The government has certain rights in this invention.

TECHNICAL FIELD

The subject disclosure relates to video processing, and more particularly to a system and method for correcting the effects of atmospheric turbulence in video data.

BACKGROUND

An automatic target recognizer (ATR) is a real-time or near-real-time image or signal processing system. An ATR typically receives an input stream of data and outputs a list of targets that it has detected and recognized from the input stream of data. An ATR system can perform other functions such as image stabilization, preprocessing, mosaicing, target tracking, activity recognition, multi-sensor fusion, common operating picture, sensor and platform control, and data organizing for transmission or display. ATR input data can be in the form of non-imaging one-dimensional (1D) sensor returns, e.g., ultra-high range-resolution (HRR) radar returns for air-to-air automatic target recognition or vibration signatures from a laser radar for recognition of ground targets. ATR data can have two-dimensional (2D) images that fall into three general views: perspective, plan and profile. Typical 2D images are infrared and synthetic aperture radar (SAR) images. ATR input data can be three-dimensional (3D), such as those from sequences of multiple exposures taken over time from a nonstationary position. As a target moves, so do sensors, and that movement can be exploited by an ATR. Hyperspectral data, which are views of the same scene looking at in different spectral bands, is another approach to obtaining multiple image data where the third dimension is wavelength.

When video is taken through turbulent air, as may be the case when an aircraft-mounted video image acquisition unit obtains video of the ground, image degradation (e.g., blurring) may be produced by atmospheric turbulence in the air through which light travels on its way from the scene to the video image acquisition unit. This blurring may degrade the quality of the video and diminish its value to an operator observing the video, or to processing equipment using the video for automated analysis or control. Thus, there is a need for a system including ATR functions with a method for mitigating the effects of atmospheric turbulence on video data.

SUMMARY OF THE TECHNOLOGY

In at least one aspect, this application describes an exemplary use of Artificial Intelligence Machine Learning (AI/ML) based dismount detection to detect moving people within a scene. Their position is calculated and passed to a turbulence correction moving tile algorithm to precisely locate the target and optimize the head and torso by suppressing low frequency atmospheric disturbances and optimize high frequency scene content for improved target recognition.

An example system for image turbulence correction of moving targets includes an automatic target recognizer (ATR) system. The ATR system includes a database arranged to store target recognition data including a plurality of reference features associated with each of a plurality of reference targets. The ATR system also includes a feature extractor and processor, in electrical communication with the database. The feature extractor and processor is arranged to receive image frames associated with one or more acquired targets from an image acquisition system. The feature extractor and processor is arranged to detect one of the presence, absence, or probability of one of the plurality of reference features associated with the one or more acquired targets within the image frames. The feature extractor and processor is arranged to calculate a position of the plurality of reference features associated with the one or more acquired targets within the image frames.

The example system includes an image processor, in electrical communication with the ATR and the image acquisition unit. The image processor is arranged to receive image frames associated with one or more acquired targets from the image acquisition system. The image processor is arranged to receive the position of the plurality of reference features of the one or more acquired targets from the ATR. The image processor is arranged to demosaic the image frames into a plurality of video tiles; each video tile being associated with an acquired target. The image processor is arranged to iteratively process the video tiles associated with the acquired targets of the image frames for turbulence correction to generate turbulence corrected video tiles associated with each of the acquired targets. The image processor is arranged to convert turbulence corrected video tiles associated with each of the acquired targets into a single video frame tile associated with each acquired target including turbulence degradation correction. The image processor is arranged to mosaic each of the single video frame tiles associated with each acquired target of the image frames to generate a full field of view turbulence corrected video stream.

The image processor may be further arranged to normalize the turbulence corrected single video frame tiles by utilizing a linear relationship between a range of pixels in a first set of image statistics and a range of pixels in a second set of image statistics, as a gain term and an offset. The image processor may be further arranged to mosaic the single video frame tiles by cropping individual tiles and performing a weighted average calculation on three overlapping horizontal, vertical, and both-horizontal-and-vertical regions. The image processor may be further arranged to overlay the single video frame tile associated with each acquired target including turbulence degradation correction with image frames from the ATR.

The images frames associated with one or more acquired targets may include a plurality of consecutive luminance frames, comprising a last frame and a plurality of preceding frames. The image frames associated with one or more acquired targets may be generated based on at least one of synthetic aperture radar (SAR), inverse synthetic aperture radar (ISAR), laser detection and ranging (LADAR), infrared detection, optical based imagery, and hyperspectral radar data.

The image frames associated with one or more acquired targets may include a plurality of consecutive chrominance frames, comprising a last chrominance frame and a plurality of preceding chrominance frames. The image processor may be further arranged to upsample each of the last chrominance frame and the preceding chrominance frames, shift the preceding chrominance frames, average the last chrominance frame and the preceding chrominance frames to form an average chrominance frame, subsample the average chrominance frame to form a subsampled chrominance frame, delay the subsampled chrominance frame, and combine the delayed subsampled chrominance frame with the enhanced luminance frame.

The system may further include a video display arranged to display the turbulence corrected video stream. The plurality of reference features may include the torso and head of a human.

An example method for correcting image turbulence of moving targets includes receiving image frames, by an image processor, associated with one or more acquired targets from an image acquisition system. The method includes receiving image frames, by an automatic target recognizer (ATR) system, associated with one or more acquired targets from an image acquisition system. The method includes detecting, with the ATR system, one of the presence, absence, or probability of one of a plurality of reference features associated with the one or more acquired targets within the image frames. The method includes calculating, with the ATR system, a position of the plurality of reference features associated with the one or more acquired targets within the image frames. The method includes receiving, by the image processor, the position of the plurality of reference features associated with the one or more acquired targets from the ATR system. The method includes demosaicing, by the image processor, the image frames into a plurality of video tiles, each video tile being associated with an acquired target. The method includes iteratively processing, by the image processor, the video tiles associated with the acquired targets of the image frames for turbulence correction to generate turbulence corrected video tiles associated with each of the acquired targets. The method includes converting, by the image processor, turbulence corrected video tiles associated with each of the acquired targets into a single video frame tile associated with each acquired targeting including turbulence degradation correction. The method includes mosaicing, by the image processor, each of the single video frame tiles associated with each acquired target of the image frames to generate a full field of view turbulence corrected video stream.

The method may include normalizing the turbulence corrected single video frame tiles by utilizing a linear relationship between a range of pixels in a first set of image statistics and a range of pixels in a second set of image statistics, as a gain term and an offset. Mosaicing each of the single video frame tiles may include cropping individual tiles and performing a weighted average calculation on three overlapping horizontal, vertical, and both-horizontal-and-vertical regions.

The image frames associated with one or more acquired targets from an image acquisition system may include a plurality of consecutive luminance frames, comprising a last frame and a plurality of preceding frames. The image frames associated with one or more acquired targets may be generated based on at least one of synthetic aperture radar (SAR), inverse synthetic aperture radar (ISAR), laser detection and ranging (LADAR), infrared detection, optical based imagery, and hyperspectral radar data.

The image frames associated with one or more acquired targets from an image acquisition system may include a plurality of consecutive chrominance frames, comprising a last chrominance frame and a plurality of preceding chrominance frames. The method may include upsampling each of the last chrominance frame and the preceding chrominance frames, shifting the preceding chrominance frames, averaging the last chrominance frame and the preceding chrominance frames to form an average chrominance frame, subsampling the average chrominance frame to form a subsampled chrominance frame, delaying the subsampled chrominance frame, and combining the delayed subsampled chrominance frame with the enhanced luminance frame.

The method may include displaying the turbulence corrected video stream on a video display. The method may include overlaying the video frame tiles associated with each acquired target including turbulence degradation correction with image frames from the image acquisition unit. The plurality of reference features may include the torso and head of a human.

DETAILED DESCRIPTION

The subject technology addresses deficiencies associated with conventional turbulence correction. The application includes exemplary apparatuses, systems and methods for an ATR system configured to realize target decisions that are more readily understandable and explainable while also reducing classifier model training time and increasing classification accuracy. In one implementation, an ATR system knows the characteristics or features of humans in its mission dependent database and extracts features from inverse synthetic aperture radar (ISAR) images based on, for example, a fundamental reference feature such as a human head or torso characteristics. Systems described herein feed video data from the ATR system to an algorithm directed toward a system for mitigating the effects of atmospheric turbulence on video data. The disclosed technology includes a system and method for processing video for determining and applying turbulence corrections that include full field of view (FOV), video manipulation, frame-to-frame registration, and stitching. In some implementations, the frame-to-frame registration process accurately measures motion across the FOV to within ⅛ pixel to support image enhancement processes such as Turbulence Correction (TC) and Electronic Scene Stabilization (ESS) and independently moving mosaic tiles stitched to form larger imagery without high frequency artifacts. This way, the subject technology removes turbulence degradation across the entire FOV to improve image resolution and contrast. The subject technology improves various technologies, such as commercial imaging, consumer imaging, and medical imaging technologies.

In some implementations, the disclosed technology uses an adaptable process for turbulence correct based on scene content, which can be used with any sensor's spectral response, for example, short wave infrared, visible, or mid-wave infrared signals. In some implementations, the disclosed technology applies vertical and horizontal weighted averages between subset images, with fixed overlap of subset images to allow for blending between the subset images. The disclosed technology then automatically corrects motion measurements when objects move through the image and automatically substitutes motion measurements for low contrast portions of the scene.

Figure 1:
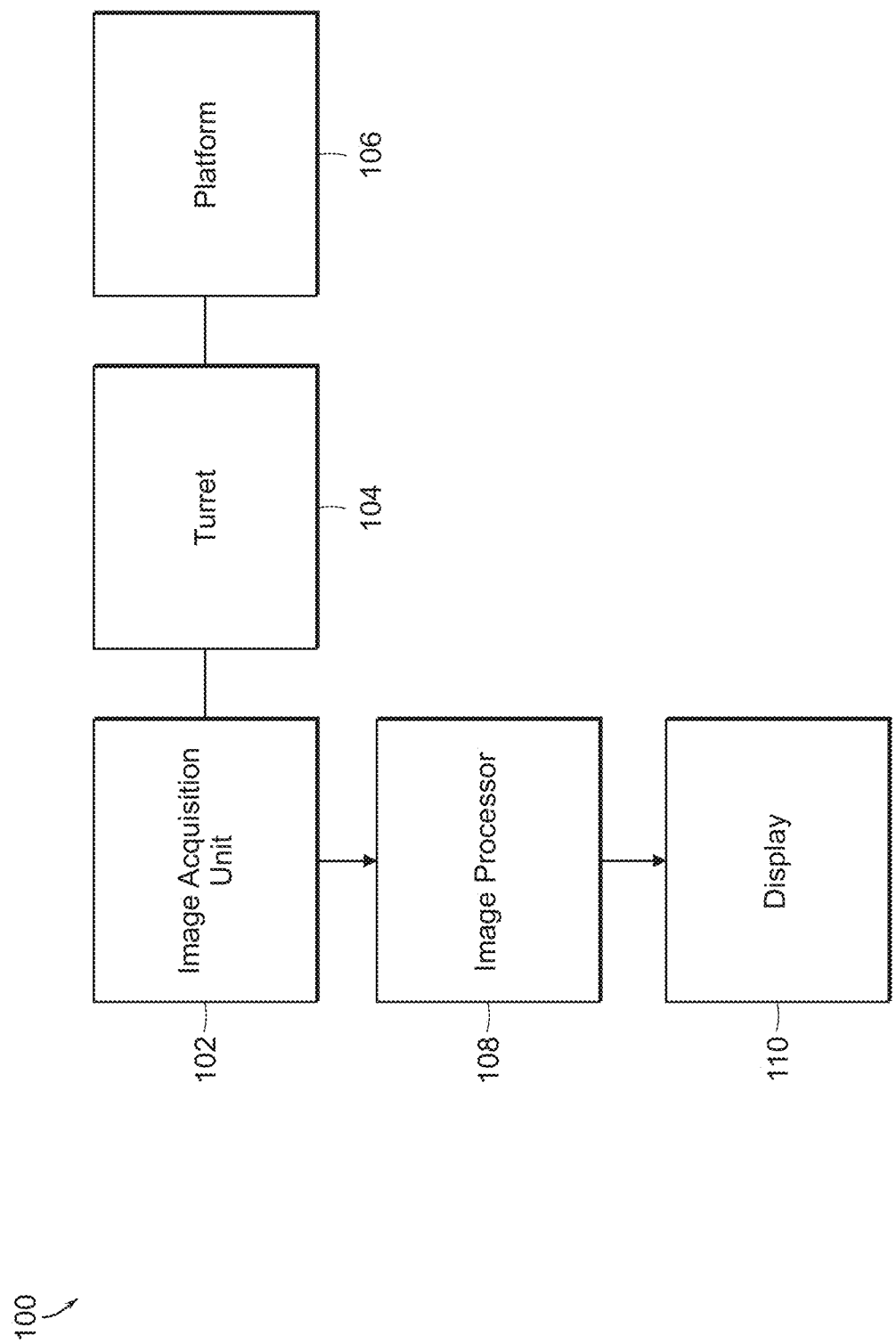
FIG. 1 is a simplified block diagram of system for image turbulence correction of moving targets, according to some implementations of the subject technology.

FIG. 1 shows a block diagram of a system for image turbulence correction of moving targets. As shown, an image acquisition unit 102 is secured to a turret 104, which is secured to a platform 106, such as an aircraft, vessel, vehicle, or human. The turret 104 steers the image acquisition unit 102, and the video from the image acquisition unit 102 is processed by an image processor 108 that generates processed video. The processed video is then displayed on a display 110, or transmitted to a control system which may, for example, control the turret 104 to track features of interest in video images obtained by the image acquisition unit 102.

The image processor 108 may be implemented in one or more processing devices or modules, explained with reference to FIGS. 2-3. The image processor 108 may include any combination of hardware, firmware, and software employed to process data or digital signals. Processing hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs).

In some implementations, the image processor 108 includes a turbulence correction (TC) processor or module, i.e., a processor including hardware, software, and/or firmware for mitigating image degradation (e.g., blurring) that may be produced by atmospheric turbulence in the air through which light travels on its way from the scene to the video image acquisition unit 102. In some implementations, the video image acquisition unit 102 is configured to generate a plurality of consecutive luminance frames, including a last frame and a plurality of preceding frames. The image processor 108 is configured to shift the plurality of preceding frames and to register the preceding frames with the last frame to form a plurality of shifted frames to form an enhanced luminance frame. The video display is configured to display the enhanced luminance frame. In some implementations, the video system produces a temporally filtered image that is reconstructed into a mosaic, for example, by the image processor 108.

As used herein, a module is a system element that receives digital numerical input and generates digital numerical output. The numerical input and output may be stored in memory in the module or external to the module. The module may be implemented in software, firmware, hardware (circuit), or in any combination thereof. In some implementations, each module is a piece of software and/or firmware (e.g., a function, a subroutine, or an object) running on a processor, for example, an image processor executing instructions.

Figure 2:
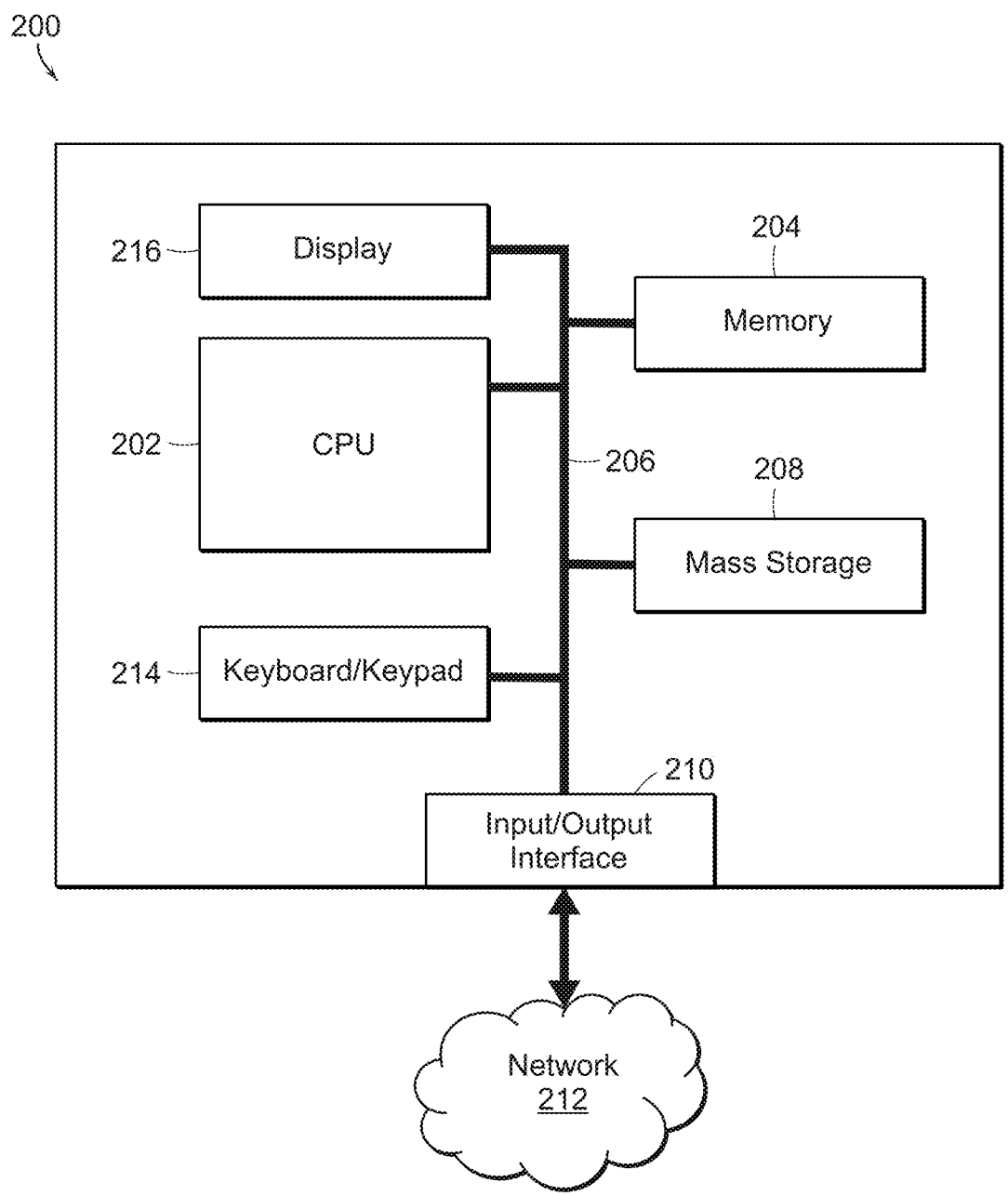
FIG. 2 is a block diagram of a computer system arranged to perform processing associated with a system for image turbulence correction of moving targets.

FIG. 2 is block diagram of a computer system 200 arranged to perform processing associated with a system for image turbulence correction of moving targets such as, for example, system 100, 300, 400, 600. FIG. 2 may resemble a computer system used as an automatic target recognizer 400 or image processor 108. The exemplary computer system 200 includes a central processing unit (CPU) 202, a memory 204, and an interconnect bus 206. The CPU 202 may include a single microprocessor or a plurality of microprocessors or special purpose processors for configuring computer system 200 as a multi-processor system. The memory 204 illustratively includes a main memory and a read only memory. The computer 200 also includes a mass storage device 208 having, for example, various disk drives, tape drives, etc. The memory 204 also includes dynamic random-access memory (DRAM) and high-speed cache memory. In operation, memory 204 stores at least portions of instructions and data for execution by the CPU 202. The memory 204 may also contain compute elements, such as Deep In-Memory Architectures (DIMA), wherein data is sent to memory and a function of the data (e.g., matrix vector multiplication) is read out by the CPU 202.

The mass storage 208 may include one or more magnetic disks, optical disk drives, and/or solid state memories, for storing data and instructions for use by the CPU 202. At least one component of the mass storage system 208, preferably in the form of a non-volatile disk drive, solid state, or tape drive, stores the database used for processing data and controlling functions of systems 100, 300, 400, 600 for image turbulence correction of moving targets. The mass storage system 208 may also include one or more drives for various portable media, such as a floppy disk, flash drive, a compact disc read only memory (CD-ROM, DVD, CD-RW, and variants), memory stick, or an integrated circuit non-volatile memory adapter (i.e. PC-MCIA adapter) to input and output data and code to and from the computer system 200.

The computer system 200 may also include one or more input/output interfaces for communications, shown by way of example, as interface 210 and/or a transceiver for data communications via the network 212. The data interface 210 may be a modem, an Ethernet card or any other suitable data communications device. To provide the functions of a processor according to FIG. 1, for example, the data interface 210 may provide a relatively high-speed link to a network 212, such as an intranet, internet, Aegis network, or the Internet, either directly or through another external interface. The communication link to the network 212 may be, for example, optical, wired, or wireless (e.g., via satellite or cellular network). The computer system 200 may also connect via the data interface 210 and network 212 to at least one other computer system to perform remote or distributed multi-sensor processing related to, for example, a common operational picture (COP). Alternatively, the computer system 200 may include a mainframe or other type of host computer system capable of Web-based communications via the network 212. The computer system 200 may include software for operating a network application such as a web server and/or web client.

The computer system 200 may also include suitable input/output ports, that may interface with a portable data storage device, or use the interconnect bus 206 for interconnection with a local display 216, such as display 110, and keyboard 214 or the like serving as a local user interface for programming and/or data retrieval purposes. The display 216 may include a touch screen capability to enable users to interface with the system 200 by touching portions of the surface of the display 216. Server operations personnel may interact with the system 200 for controlling and/or programming the system from remote terminal devices via the network 212. This may include remote, automated, and robotic tasking of the automatic target recognizer 400 or image processor 108.

The computer system 200 may run a variety of application programs and store associated data in a database of mass storage system 208. One or more such applications may include an automatic target recognizer 400 or image processor 108 as described herein.

The components contained in the computer system 200 may enable the computer system to be used as a server, workstation, personal computer, network terminal, mobile computing device, mobile telephone, System on a Chip (SoC), and the like. As discussed above, the computer system 200 may include one or more applications such as waveform control, streaming cross-correlations, artifact corrections, target acquisitions, turbulence corrections, and the tracking and discrimination of targets. The system 200 may include software and/or hardware that implements a web server application. The web server application may include software such as HTML, XML, WML, SGML, PHP (Hypertext Preprocessor), CGI, and like languages.

The foregoing features of the disclosure may be realized as a software component operating in the system 200 where the system 200 includes Unix workstation, a Windows workstation, a LINUX workstation, or other type of workstation. Other operation systems may be employed such as, without limitation, Windows, MAC OS, and LINUX. In some aspects, the software can optionally be implemented as a C language computer program, or a computer program written in any high level language including, without limitation, Javascript, Java, CSS, Python, Keras, TensorFlow, PHP, Ruby, C++, C, Shell, C#, Objective-C, Go, R, TeX, VimL, Perl, Scala, CoffeeScript, Emacs Lisp, Swift, Fortran, or Visual BASIC. Certain script-based programs may be employed such as XML, WML, PHP, and so on. The system 200 may use a digital signal processor.

As stated previously, the mass storage system 208 may include a database. The database may be any suitable database system, including the commercially available Microsoft Access database, and can be a local or distributed database system. A database system may implement Sybase and/or a SQL Server. The database may be supported by any suitable persistent data memory, such as a hard disk drive, RAID system, tape drive system, floppy diskette, or any other suitable system. The system 200 may include a database that is integrated with systems 100, 300, 400, 600, such as database 304, however, it will be understood that, in other implementations, the database and mass storage 208 can be an external element.

In certain implementations, the system 200 may include an Internet browser program and/or be configured operate as a web server. In some configurations, the client and/or web server may be configured to recognize and interpret various network protocols that may be used by a client or server program. Commonly used protocols include Hypertext Transfer Protocol (HTTP), File Transfer Protocol (FTP), Telnet, and Secure Sockets Layer (SSL), and Transport Layer Security (TLS), for example. However, new protocols and revisions of existing protocols may be frequently introduced. Thus, in order to support a new or revised protocol, a new revision of the server and/or client application may be continuously developed and released.

In one implementation, the systems 100, 300, 400, 600 include a networked-based, e.g., Internet-based, application that may be configured and run on the system 200 and/or any combination of the other components of the systems 100, 300, 400, 600. The computer system 200 may include a web server running a Web 2.0 application or the like. Web applications running on systems 100, 300, 400, 600 may use server-side dynamic content generation mechanisms such, without limitation, Java servlets, CGI, PHP, or ASP. In certain implementations, mashed content may be generated by a web browser running, for example, client-side scripting including, without limitation, JavaScript and/or applets on a wireless device.

In certain implementations, system 100, 300, 400, and/or 600 may include applications that employ asynchronous JavaScript+XML (Ajax) and like technologies that use asynchronous loading and content presentation techniques. These techniques may include, without limitation, XHTML and CSS for style presentation, document object model (DOM) API exposed by a web browser, asynchronous data exchange of XML data, and web browser side scripting, e.g., JavaScript. Certain web-based applications and services may utilize web protocols including, without limitation, the services-orientated access protocol (SOAP) and representational state transfer (REST). REST may utilize HTTP with XML.

Systems 100, 300, 400, 600, computer system 200, or a component of systems 100, 300, 400, 600 may also provide enhanced security and data encryption. Enhanced security may include access control, biometric authentication, cryptographic authentication, message integrity checking, encryption, digital rights management services, and/or other like security services. The security may include protocols such as IPSEC and IKE. The encryption may include, without limitation, DES, 3DES, AES, RSA, ECC, and any like public key or private key based schemes.

It will be apparent to those of ordinary skill in the art that certain aspects involved in the operation of the system 100, 300, 400, 600, or other devices may be embodied in a computer program product that includes a computer usable and/or readable medium. For example, such a computer usable medium may consist of a read only memory device, such as a CD ROM disk or conventional ROM devices, or a random access memory, such as a hard drive device or a computer diskette, or flash memory device having a computer readable program code stored thereon.

Figure 3:
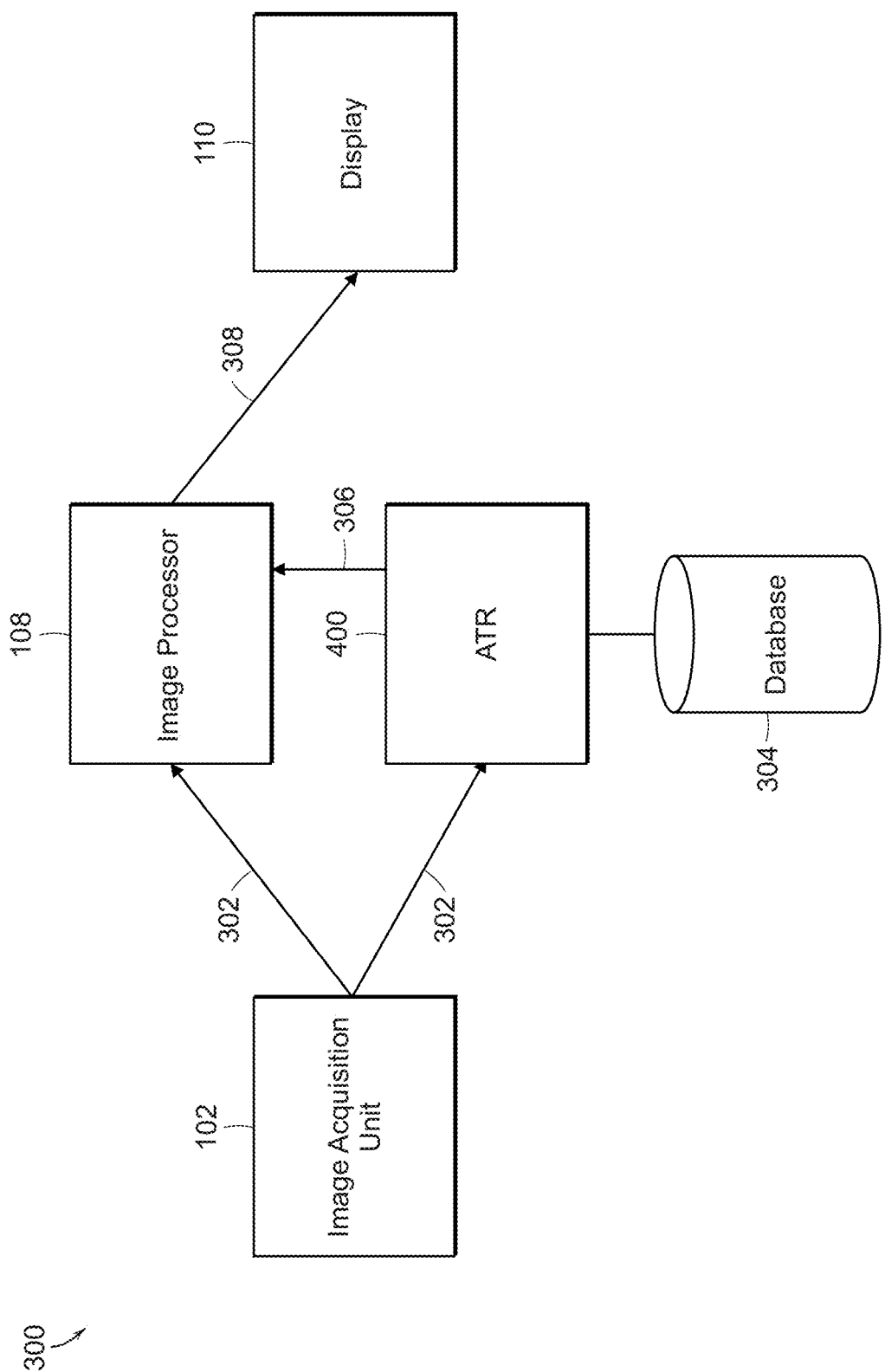
FIG. 3 is functional block diagram showing an automatic target recognizer feeding target data into an image processor, according to some implementations of the subject technology.

FIG. 3 is a functional block diagram showing a system 300 for image turbulence correction of moving targets. System 300 includes an image acquisition unit 102. The image acquisition unit 102 may interface with and/or include a radar transceiver used to emit radar pulses and/or receive echoes from an illuminated target or terrain. Image acquisition unit 102 may use any of various spectrum estimation techniques to create video data associated with a target. The image acquisition unit 102 may use fast Fourier transform imaging techniques including periodogram or matched filters, a Capon method, APES method, SAMV method, parametric subspace decomposition methods, MUSIC method, Overlapped Sub Aperture (OSA), autofocus, time-domain backprojection, and/or frequency-domain backprojection among other known techniques.

Image acquisition unit 102 may use variation reduction techniques depending on whether a synthetic aperture radar (SAR) or inverse synthetic aperture radar (ISAR) is used to acquire target data. Unit 102 may use techniques such as image energy normalization and/or pose rectification in RF signal processing and image formation. Unit 102 may apply a polar mapping method for ISAR images. Image acquisition unit 102 may use various techniques to process raw radar target data to form a human perceivable image of an illuminated target such as a human being. Alternatively, image acquisition unit 102 may process received radar data into a non-perceivable form that is then further processed by, for example, a preprocessor to realize a human perceivable image. Image acquisition unit 102 may process images and/or image data based on, without limitation, SAR, ISAR, laser detection and ranging (LADAR), infrared detection, EO/IR (optical based imagery), and/or hyperspectral radar data. Image acquisition unit 102 may include a camera.

Image frames 302, such as video data, collected from the image acquisition unit 102 is fed into an automatic target recognizer (ATR) 400 and an image processor 108. The image frames 302 can be in the form of non-imaging one-dimensional (1D) sensor returns, e.g., ultra-high range-resolution (HRR) radar returns for air-to-air automatic target recognition or vibration signatures from a laser radar for recognition of ground targets. The image frames 302 can have two-dimensional (2D) images that fall into three general views: perspective, plan and profile. Typical 2D images are infrared and SAR images. The image frames 302 can be three-dimensional (3D), such as those from sequences of multiple exposures taken over time from a nonstationary position.

An ATR 400 is an artificial intelligence machine learning (AI/ML) based dismount detection system to detect moving people or objects within a scene. ATR 400 receives the image frames 302, including image frames associated with one or more acquired targets from an image acquisition system 102, detects one of the presence, absence, or probability of one of the plurality of reference features associated with the one or more acquired targets within the image frames, and calculates target data 306, including a position of the plurality of reference features associated with the one or more acquired targets within the image frames. The ATR 400 typically receives the input stream of image frames 302 and outputs, to the image processor 108, target data 306, including a list of targets that it has detected and recognized from the input stream of image frames 302 based on reference features stored in database 304, where the database 304 is in electric communication with the ATR 400. The ATR database 304 may store target recognition data including a plurality of reference features associated with each of a plurality of reference targets (e.g., human features such as a human head, arms, or torso).

The image processor 108 uses the target data 306 to correct the image frames 302 for turbulence and communicates 308 a turbulence corrected video stream to a display 110.

Figure 4:
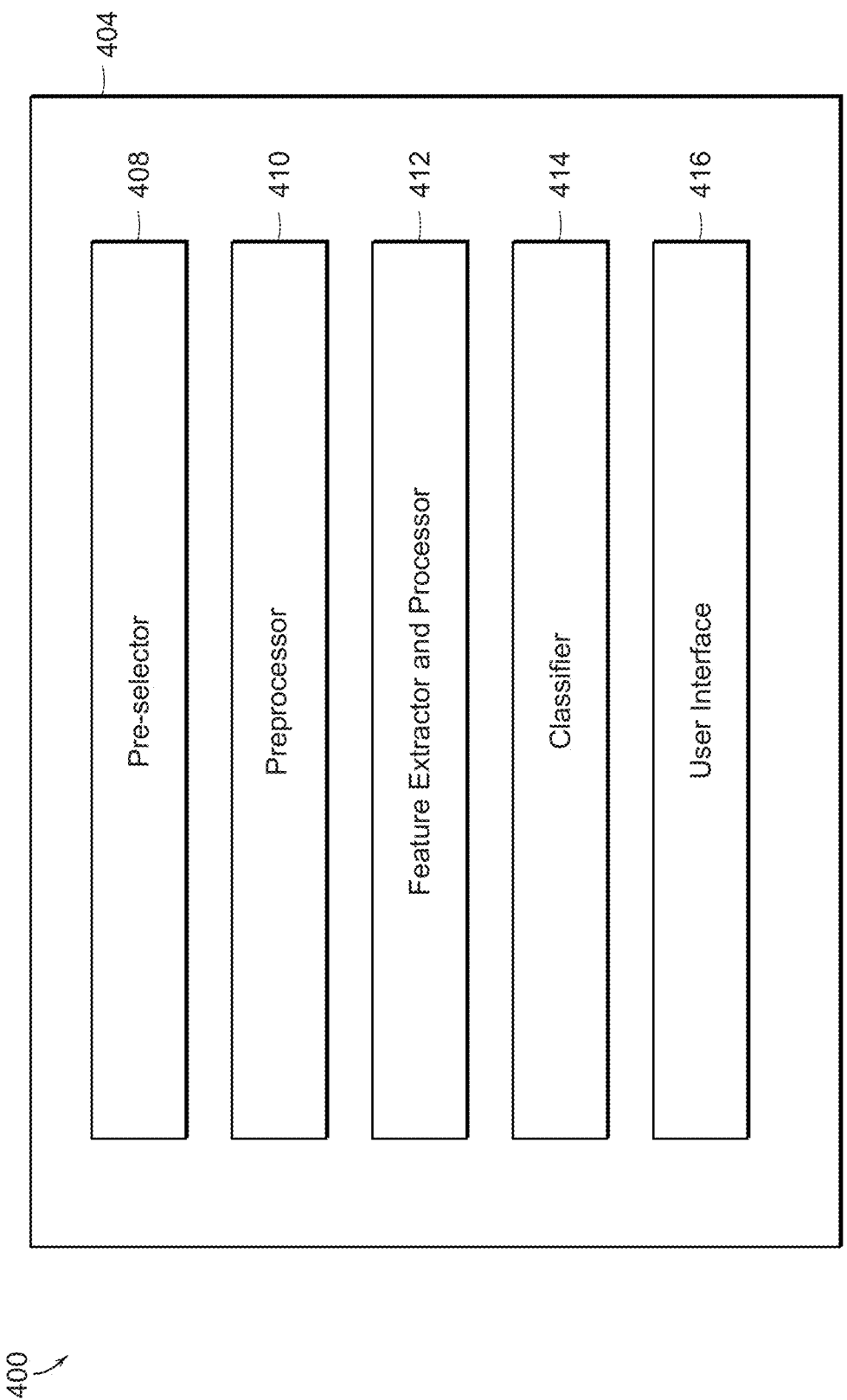
FIG. 4 is block diagram of a ATR modules, including a pre-selector, preprocessor, feature extractor and processor, classifier, and user interface.

Referring now to FIG. 4, the ATR 400 system is described in further detail. ATR 400 is a real-time or near-real-time image or signal processing system. The ATR 400 system can perform other functions such as image stabilization, preprocessing, mosaicing, target tracking, activity recognition, multi-sensor fusion, common operating picture, sensor and platform control, and data organizing for transmission or display. As a target moves, so do sensors, and that movement can be exploited by an ATR 400. Hyperspectral data, which are views of the same scene looking at in different spectral bands, is another approach to obtaining multiple image data where the third dimension is wavelength. ATR 400 may an include an ATR server 404, a pre-selector 408, a preprocessor 410, a feature extractor and processor 412, a classifier 414, and a user interface 416, though any suitable ATR 400 with several different modules is contemplated herein.

Pre-selector 408 may designate a human characteristic or an object characteristic, determined by preprocessor 410, as an acquired reference feature that determines how further processing of the image is performed by ATR system 400. In certain implementations, pre-selector 408 selects a portion or subset of target recognition data in database 304, based on a fundamental characteristic of a class of target, such as, without limitation, target length, target width, target height, target state, target kinematics, target shape, target location, target contour, target features and/or mission context. Target state refers to intrinsically sensed characteristics, such as maneuvering and the presence or absence of a human head, arms, legs, torso, and the like.

ATR 400 may perform some of or all of the operations described with respect to image acquisition unit 102 using a preprocessor 410. The preprocessor 410 may perform additional processor techniques to further enhance an image. The preprocessor 410 may analyze an image to determine one or more features depicted in the image, such as a human. As such, the preprocessor 410 identifies the head and torso of the human and estimates an apparent length and the aspect angle of the image. The aspect angle information combined with the apparent length information gleaned from the image may be used to compute a true length. Preprocessor 410 may estimate any one or more characteristics of human depicted in the image frames 302 such as, without limitation, length, height, width, shape, location, contour, features, and kinematics. The preprocessor 410 may perform one or more quality checks of images to determine if the image is of sufficient quality to perform a target recognition analysis.

Feature extractor and processor 412 may be configured to compare and/or discriminate the acquired reference feature from preprocessor 410 with the acquired reference feature selected by pre-selector 408 and, if there is a match, extract multiple segments from an acquired image. A comparative match may be determined to have occurred when a difference in the features of the acquired human target and the features of the one or more reference features in database 304, such as human features, are less than or equal to a pre-determined percentage difference. For example, less than or equal to one of 1%, 5%, 10%, 20%, 30%, 40%, and 50%. Pre-determined means that the feature extractor and processor 412 has been programmed and/or configured with a percentage difference value and/or setting. Feature extractor and processor 412 may then discriminate the presence or absence of features associated with each of the multiple reference targets in the database 304. Feature extractor and processor 412 may use various techniques such as, without limitation, statistical methods, wavelet decomposition, normalized linear correlation, synthetic discrimination filter, or neural networks to detect and/or discriminate features in various segments of an acquired image. Feature extractor and processor 412 may use various techniques to refocus and/or enhance image segments including super resolution methods that combine multiple images over time. Image enhancement may be for human visualization and/or machine interpretation.

Classifier 414 may be configured to create multiple classification problems associated with the portion of the target recognition data based on the acquired reference features. Classifier 414 may create multiple decision trees that solve the multiple classification problems. Classifier 414 may use Bayesian networks or directed acyclic graphs (DAG). Classifier 414 may select the decision tree having the minimal misclassification cost and determine a classification of the acquired target shown in an image based on the decision tree having the minimal misclassification cost. Classifier 400 may then generate a classification decision report based on the determined classification of the acquired target in image. User interface 416 may be arranged to display the classification decision report to an operator.

Classifier 414 may use one or more neural networks, such multilayer perceptrons (MLPs), convolutional neural networks (CNNs), or deep Boltzman machines (DBM) that are trained to compute a function that maps an input vector or image to an output vector. The N-element output vector may convey estimates of the probabilities of N target classes and/or features. In some implementations, classifier 414 uses a recurrent neural network (RNN) where its neurons send feedback signals to each other to enable dynamic temporal behavior. Classifier 414 may use an enhanced RNN referred to as long short-term memory (LSTM) and/or hierarchal temporal memory (HTM). Classifier 414 may use fuzzy logic. Classifier 414 may combine multiple aforementioned algorithms to form a hybrid system. A decision tree is a generic term that describes a decision process that may use one or more attributes at each node and/or use an information theoretic measure to formulate queries at each node. It does not refer to a specific implementation, but may include one or a combination of ID3, C4.5, and/or CART.

The classification decision report may include a graphical explanation of the determined classification of the acquired target. The classification report may include a graphical representation of the decision tree having the minimal misclassification cost. The classification report may include the extracted features (e.g., image chips) or machine representations of those features, such as the activation values of a neural network hidden layer forming a mapping or manifold.

In some implementations, classifier 414 fuses a portion of reference features of the multiple reference features in database 304 to provide confidence metrics associated with a determined classification of an acquired target in an image. In some implementations, pre-selector 408 selects a portion of the target recognition data in database 304 based additionally on a reference feature. For example, if the first reference feature is the torso of a human, the second reference feature may be the head of a human or features thereon. Feature extractor and processor 412 may additionally compare an acquired second reference feature with a second reference feature. Classifier 414 may create the multiple classification problems based additionally on the acquired second reference feature. Classifier 414 may determine the position of the plurality of reference features associated with the one or more acquired targets within the image frames.

Referring back to FIG. 3, the image acquisition unit 102 feeds the image frames 302 associated with one or more acquired targets to an image processor 108, in electric communication with the image acquisition unit 102. The image frames 302 may be delayed within the image processor to align the image frames 302 with target data 306 from the ATR 400. As such, the image processor 108 receives target data 306 from the ATR 400, including the position of the plurality of reference features associated with the one or more acquired targets within the image frames.

An example image processor 108 may include a TC module that performs image turbulence correction using a tile approach as described in U.S. Pat. No. 10,521,883 B1 (Hayes, Beardsley, & Fluckiger) entitled "IMAGE TURBULENCE CORRECTION USING TILE APPROACH". The contents of U.S. Pat. No. 10,521,883 B1, particularly the content related to FIGS. 2-6 and accompanying description, is incorporated herein by reference.

The input image frames 302 are received by the image processor 108 and then demosaiced into a plurality (e.g., 18) of same-size overlapping tiles, organized in rows and columns by a demosaicing circuit. A temporal stack of each video tile is then stored in memory for later use. A frame registration engine is used for each tile in the first row of the demosaiced tiles (e.g., 6 tiles in a row of 18 demosaiced tiles). The frame registration engines (e.g., one engine for each row of demosaiced tiles) are then reused for subsequent rows of tiles. This way, a separate frame registration engine is used for each tile in each row of the demosaiced tiles.

A frame registration calculation is performed on each tile to determine a displacement (e.g., dX and dY, i.e., the linear displacement in a two-dimensional coordinate system) relative to the previous frame tile, by a frame shifter. The results are then provided to a sub-pixel frame shifter. A temporal stack of video tile (e.g., 6 tile frames in this example) from the stored temporal stack of video tiles is spatially aligned by the frame shifter. It is noted that the turbulence correction process better reduces the atmospheric disturbances on images if they are spatially aligned. The current tile frame is then measured for image statistics that are stored as an array in memory for later use. The current tile frame's image statistics is utilized to ensure that overall dynamic range of output image matches as closely as possible to an input tile histogram.

The spatially aligned stack of tiled video images is then converted to the frequency domain, for example, by inputting them to a two-dimensional Fast Fourier Transform (2D FFT) and/or 2D Inverse FFT (IFFT) (2D FFT/IFFT) circuit, as known in the art, to convert the video images to the frequency domain. A turbulence correction iterative loop is applied to the stack of images, by a turbulence correction (TC) module or processor. The output is fed back through the 2D FFT/IFFT circuit to perform an IFFT to return the output of TC module to the spatial domain. This spatial domain output of the 2D FFT/IFFT circuit is a single frame tile that has had turbulence degradation corrected by the TC module. This output is then stored in the memory and used twice. The first use calculates the image statistics to determine the range of pixels from minimum to maximum in addition to the median/mean from a histogram that is formed from the image statistics. The pixel value range of the image is compared to the current tile frame pixel value range, taken prior to turbulence correction process to determine a linear relationship between the two values.

The linear relationship between these two values is used as the gain term in normalizing the image. For example, in some implementations, the most recent image tile in the stack is used to generate the input statistics. After the stack of image tiles is processed with turbulence correction, a single image tile is created. the corrected image tile statistics is then compared to the input statistics and normalized to the input image tile. Also, the difference between current tile frame median and post processing tile median is used as a level shift of the post processed tile.

The stored spatial domain output of the 2D FFT/IFFT circuit is also used to apply the gain and level shift to the post processing tile image and therefore closely match the current tile frame statistics. In some implementations, a matching process determines the difference between current image tile and post turbulence correction tile (e.g., by level shifting) and determines the relationship between the current image tile pixel value range and post turbulence correction tile pixel value range (e.g., the gain). The post turbulence correction tile pixel values are then shifted using the level shift value. This centers the post turbulence correction pixel values range equally to the current image tile. The post turbulence correction pixel values are then multiplied by the calculated gain resulting in an output image tile. This output image tile shares the median value and pixel value range of the current image tile.

A normalization circuit then applies normalization to tiles before they are stitched together, using the linear relationship between the pixel value range of the image and the current tile frame pixel value range. Subsequently, all tiles are transferred serially and mosaiced back together, by a mosaic processor. The mosaicing process performed by the mosaic processor includes cropping of the individual tiles and a weighted average being applied across the three overlapping regions, that is, horizontal, vertical, and both, of the tiles. In some implementations, this weighted averaging is based on the start of the overlapping regions. The output is a full FOV turbulence correct video stream.

In some implementations, the circuits described above perform a less complex process for image turbulence correction of moving targets. For example, a plurality of consecutive image frames comprising a previous image frame, a current image frame and a plurality of preceding image frames are received; the current image frame is then demosaiced into a plurality of same size overlapping video tiles (e.g., by the demosaicing circuit or the image processor 108); a displacement of each of the video tiles of the current frame relative to respective video tiles of the previous frame is determined to spatially align the video tiles of the current frame with video tile of the previous frame (e.g., by the frame shifter); the video tiles are then converted into a frequency domain (e.g., by the 2D FFT/IFFT circuit); and the video tiles of the previous image frame, the current image frame and the plurality of preceding image frames are iteratively processed for turbulence correction in the frequency domain (e.g., by the or the image processor 108 or TC module). The turbulence corrected video tiles is converted back into a spatial domain e.g., by the 2D FFT/IFFT circuit, where the converted turbulence corrected video tiles is a single video frame tile including turbulence degradation correction; and the single video frame tiles of the previous image frame, the current image frame and the plurality of preceding image frames are mosaiced together to generate a full field of view (FOV) turbulence correct video stream (e.g., by the mosaic processor).

An example frame registration engine is described in U.S. Pat. No. 10,521,883 B1 (Hayes, Beardsley, & Fluckiger) entitled "IMAGE TURBULENCE CORRECTION USING TILE APPROACH".

In some implementations, image processor 108 dynamically matches and tile mosaics video tiles by creating a histogram of the image input tile from individual video tiles. From the histogram, the image processor 108 calculates a set of image statistics such as, max, min, and median of the pixels of the image input tile. The video tile is then processed, for example, by the TC module to correct the turbulence. This post processed image tile is measured and a second histogram is created from this image tile, for example, by the TC module. The post processed image tile is provided to dynamic range in addition to the input tile statistics and post processed tile statistics. A linear relationship between the input tile statistics and post processed tile statistics is then formed.

A gain term is also calculated based on the maximum to minimum ratio of the input tile to the post processed tile. In addition, a level offset for level shifting is calculated, based on the difference in the medians of the input tile and the post processed tile. The post processed tile is multiplied by the gain term and shifted by adding the level offset previously calculated.

The final mosaiced image is a combination of all subsequent tiles that have been processed through the turbulence correction algorithm and dynamic range matching. Each tile overlaps other tiles in multiple spatial areas. Horizontal overlap is calculated by weighting each tile's overlap based on its position relative to the start of overlap by the image processor 108 or a similar processor. For example, as the position moves spatially to the right, the weighting of the left tiles' pixels have less and less and subsequently the right tiles' pixels are weighted more and more. Vertical overlap is applied to the vertical overlap area between tiles spaced vertically. Vertical overlap image is calculated by weighting the contributing tiles' pixels based on their relative position of the start of the overlap. As the positions move vertically downward, the upper tile's pixels are weighted less and less and the lower tile's pixels are weighted more and more.

In some implementations, there are areas with horizontal and vertical overlaps, requiring a slightly different approach. In some implementations, there are four contributing tiles for these areas. As one moves from the top left to the bottom right of the overlapping region pixels from the left and top are weighted less and less, but pixels from the bottom right are weighted more and more by image processor 108. As one moves left to right, the left tile's pixels are weighted relatively less and less and the right tile's pixels weighted relatively more and more. As one moves from downwards vertically the upper tile's pixels are weighted less and less and lower tile's pixels are weighted more and more.

The outputs of nonoverlapping regions, horizontal overlapping regions, vertical overlapping regions, and combined horizontal and vertical overlapping regions may be stored in memory as mentioned with reference to memory 204 in FIG. 2.

In some implementations, the spatial/frequency domain processing proceeds according to equations 4-7 and the accompanying description in U.S. Pat. No. 10,521,883 B1 (Hayes, Beardsley, & Fluckiger) entitled "IMAGE TURBULENCE CORRECTION USING TILE APPROACH".

An example image processor 108 may include a TC module that performs full motion color video atmospheric turbulence correction as described in U.S. Pat. No. 10,719,924 B2 (Fluckiger, Beardsley, Franklin) entitled "FULL MOTION COLOR VIDEO ATMOSPHERIC TURBULENCE CORRECTION PROCESSING". The contents of U.S. Pat. No. 10,719,924 B2, particularly the content related to FIGS. 2-6 and accompanying description, is incorporated herein by reference.

As such, image processor 108 may include one or more field programmable gate arrays (FPGAs) such as FPGA1 and FPGA2. The image frames 302 from the image acquisition unit 102 may contain full frames of video with a resolution of 1080p, i.e., 1920×1080 pixels, at a frame rate of 30 Hz. Each full frame may include a full luminance, or "luma", frame and a full chrominance, or "chrome", frame; the full chrominance frame may be subsampled (i.e., it may have lower resolution than the full luminance frame). A region of interest extraction module may be used to extract from the received full video frames a region of interest, and store the corresponding frames in a frame memory, overwriting old frames when they are no longer needed. As used herein, the term "full frame" being used to refer to full video frames received from the image acquisition unit 102. Like a full frame, each frame (of the region of interest) may include a luminance frame and a chrominance frame. These frames may be, e.g., 256×256 pixels, or 512×256 pixels, and may consist of a square or rectangular region at or near the center of the field of view of the image acquisition unit 102. The frames may be processed to increase the quality of the video. Processing only a region of interest may reduce the computational burden on the image processor 108.

The image processor 108 may operate on K frames (of the region of interest) at a time, including a most recent frame, or "last frame", and K−1 "preceding frames", received before the last frame. In one implementation K=6, i.e., the system operates on 6 frames at a time. A frame registration module may be used to determine a shift that may be used to register the preceding frames to the last frame, and this shift may be used to register both the luminance and the chrominance frames. The luminance frames may then be processed by a TC module to form enhanced luminance frames, and the chrominance frames may be processed by a chrominance averaging module to form subsampled average chrominance frames. Finally, the enhanced luminance frames may be recombined with the subsampled average chrominance frames in an output processing module, to form enhanced color video frames, or "output video", which may be displayed on the display 110.

The frame registration module takes two inputs: a reference frame, i.e., the last frame, and an input frame, which is the second-last frame, or "last preceding frame", i.e., the frame received before the last frame. Both the reference frame and input frame may be luminance frames. The reference frame is processed by a noise-filtering module which may include a median filter (e.g., a 3×3 median filter) and/or a low-pass filter (e.g., a low-pass filter, such as a Gaussian filter, with a corner frequency of between 7 and 10 pixels). If both a median filter and a low-pass filter are used in the noise-filtering module, the median filter may precede the low-pass filter or vice versa. The output of the noise-filtering module may be processed by two parallel Sobel filters, each of which performs a numerical differentiation, one in the X direction (a horizontal differentiating filter) and one in the Y direction (a vertical differentiating filter). The outputs of the X-Sobel filter (or horizontal Sobel filter) and the Y-Sobel filter (or vertical Sobel filter) are arrays of the same size or approximately the same size as the reference frame, and are referred to as gx (or an X-derivative frame) and gy (or a Y-derivative frame) respectively. A 2×2 matrix of edge strengths is then calculated as EdgeStrengths=[sum (gx2), sum(gx*gy); sum(gx*gy), sum(gy2)], where gx*gy denotes an element-wise product, the semicolon is a delimiter between the first and second rows of the matrix, and the sum function sums over all elements of the argument of the function, the arguments in the expression for EdgeStrengths each being a 2-dimensional array. A gradient is then calculated in a gradient module, the gradient being the vector Grad=[sum(gx*Diff), sum(gy*Diff)], where Diff is the difference between the reference frame and the input frame, calculated in a difference module. A global shift estimate module then calculates an estimate of the shift required to register the input frame to the reference frame. This estimate is calculated as inv(EdgeStrengths)*Grad, where inv(EdgeStrengths) is the inverse of the 2×2 EdgeStrengths matrix, and the product is a matrix product. The input image is then shifted, and the process is repeated. In one implementation, the image is shifted using a bicubic spline to interpolate between pixels, making shifts of a fraction of a pixel possible.

The calculation and application of the estimated shift required to register the frames may be repeated, in a loop, a fixed number of times, or until the estimated shift required is less than a lower threshold selected to test for adequate registration. In one implementation the loop is repeated 10 times, and the global shift estimate at the end of the final iteration is used to determine whether the frame registration succeeded. For example a global shift estimate that is less than +/−½ a pixel in the X direction and less than +/−½ a pixel in the Y direction may be considered an indication that frame registration succeeded; a global shift estimate that is larger in either direction may be considered an indication that frame registration failed. If the frame registration has succeeded, then all K−1 of the preceding frames are shifted according to the final global shift estimate, and the set of K frames, thus registered to each other, is sent to the TC module for further processing. When the K−1 frames are shifted, K−2 of them are frames that may have already been shifted, e.g., before the current frame was received. Thus, the shift in previous frames may accumulate as new frames are received. The K frames are also saved in the frame memory so that when the next new frame is received, the set of frames that will then form the K−1 previously received frame will already be registered to each other. In one implementation, only luminance frames are used to determine the shift required to register the input frame to the reference frame (i.e., chrominance frames are not used for this purpose). Once determined, the shift is applied to shift the K−1 previously received luminance frames to register them to the last luminance frame, and the same shift is applied to shift the K−1 previously received chrominance frames to register them to the last chrominance frame.

In the case where frame registration fails, the preceding frames are purged or marked as unusable, and the process starts again when another frame is received. If frame registration has not failed during the previous K frames, then a set of K frames is sent to the TC module.

The modules of the image processor 108 may be distributed across multiple FPGAs; for example, the TC module may be implemented in a second FPGA. In such a system data may be transferred between the FPGAs using, for example, a communications interface, implemented in each of the FPGAs. A first-in-first-out data structure (FIFO) may be used with the interface, for example, to buffer received data until processing begins.

In one implementation the TC module implements a numerical solution of a Sobolev-Laplace partial differential equation, which includes a time-reversed diffusion equation and a Laplace filter. The solution is generated numerically in the frequency domain. Each of the K frames received from the frame registration module is transformed by Fourier transform (e.g., by fast Fourier transform, or FFT) into the spatial frequency domain to form one of K Fourier transform frames. An iterative solution module then iteratively adjusts the K Fourier transform frames, each iteration producing a better approximation to the solution of the partial differential equation.

For example, the spatial frequency domain processing may proceed according to equations 1-4 as described in U.S. Pat. No. 10,719,924 B2 (Fluckiger, Beardsley, Franklin) entitled "FULL MOTION COLOR VIDEO ATMOSPHERIC TURBULENCE CORRECTION PROCESSING". Once an acceptable solution has been generated in the spatial frequency domain, the resulting K frames are averaged together and an inverse FFT (IFFT) is used to transform the average frame back into the image domain, forming an enhanced frame. If the input frames are luminance frames, then the output frames are enhanced luminance frames.

The TC module may be implemented in a FPGA. In one implementation, Fourier transform frames are fed alternately into two double data rate synchronous dynamic random-access memories (e.g., DDR2 memories), via respective memory ports. For example, if K=6 (i.e., 6 frames contribute to each output of the TC module), then Fourier transform frames 1, 3, and 5 may be in the first DDR2 memory and Fourier transform frames 2, 4, and 6 may be in the second DDR2 memory. A multiplexer transfers two or three frames at a time into the math engine, which executes operations. Two frames, for example, are transferred when calculating an updated value for an "end frame" (the first or Kth Fourier transform frame), and three Fourier transform frames are transferred when calculating an updated value for any of the other ("intermediate") Fourier transform frames. A math engine takes as input the parameters alpha, lambda, and mu, and an initial value of a quantity NormGrad for each Fourier transform frame, as referenced in Listing 1 of U.S. Pat. No. 10,719,924 B2 (Fluckiger, Beardsley, Franklin) entitled "FULL MOTION COLOR VIDEO ATMOSPHERIC TURBULENCE CORRECTION PROCESSING". To average all of the Fourier transform frames prior to taking the IFFT, the math engine sums the Fourier transform frames in the first DDR2 memory to form a first sum, and sums the Fourier transform frames in the second DDR2 memory to form a second sum, then sums the first sum and the second sum and divides by the number of Fourier transform frames (e.g., 6).

The processing of chrominance frames may proceed where frames received from the image acquisition unit 102 may include both full resolution luminance frames, and chrominance frames subsampled with a chrominance subsampling ratio of 4:2:0. Each chrominance frame is, in one embodiment, upsampled to full resolution (4:4:4 subsampling) during the interpolation process used to shift the frame according to the shift estimate generated by the frame registration module. Thus, the result of the shifting is a set of K full resolution chrominance frames, which are shifted so as to be registered to each other and to the luminance frames. These chrominance frames are averaged together, forming one average chrominance frame at full resolution, and then subsampled to a chrominance subsampling ratio of 4:2:0, delayed for synchronization with the luminance frames (which may be delayed, e.g., by two frames, in the TC module), and recombined with the enhanced luminance frames.

Because the luminance frame processing may affect the gain and offset of the luminance frames, a Color Fidelity Output Adjustment module may also measure the median value and range (i.e., the maximum value minus the minimum value) of input luminance frames, and multiply the enhanced luminance frame by a scale factor and add an offset so that the median value and range of the enhanced luminance frame are the same as those of the input luminance frame, before combining the chrominance frame with the luminance frame. The combined chrominance and luminance frame that results may then be fed to a display 110 to be displayed to an operator.

Figure 5:
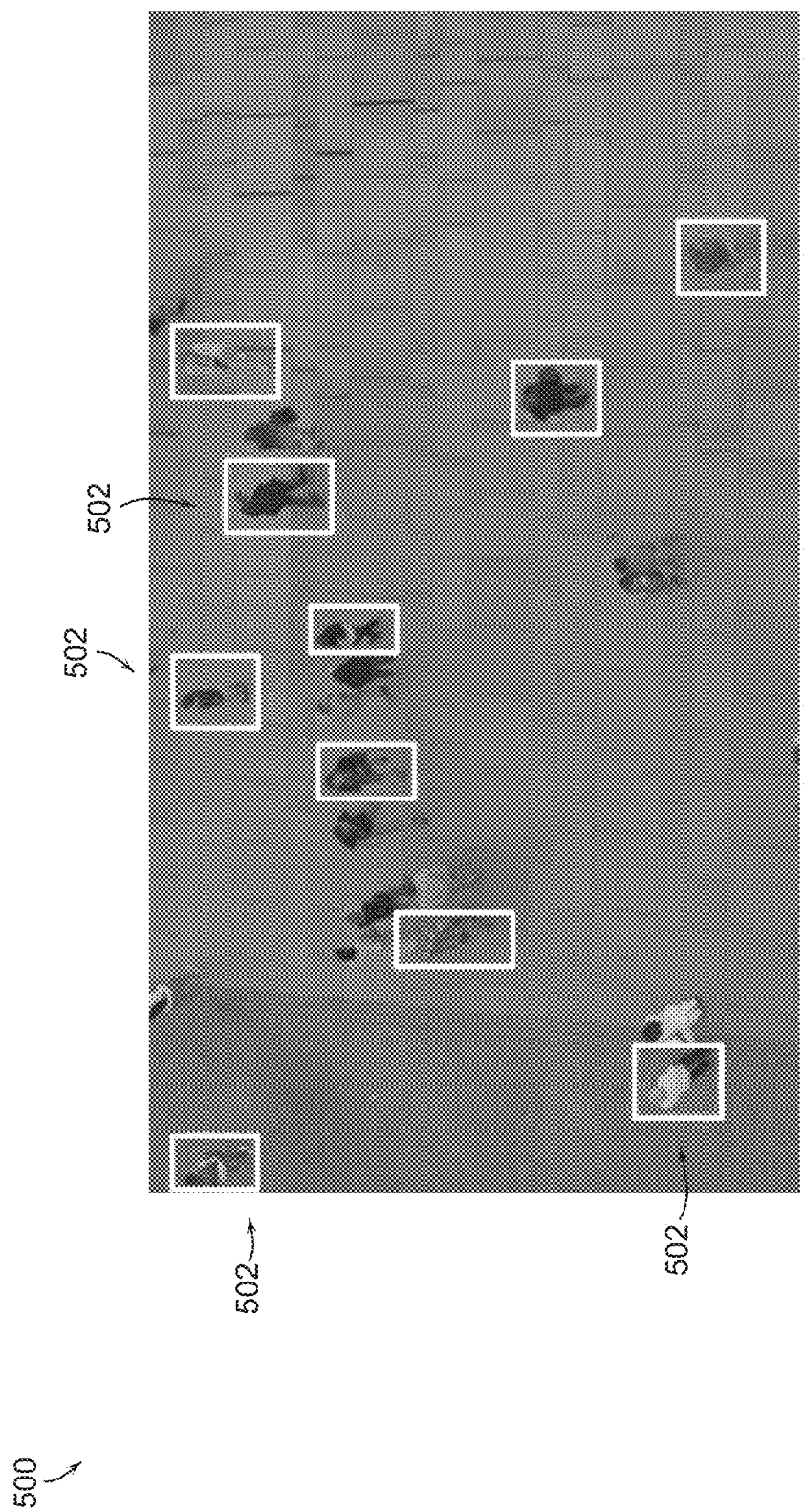
FIG. 5 is an overhead perspective view of dismount detection performed by an automatic target recognizer.
Figure 6:
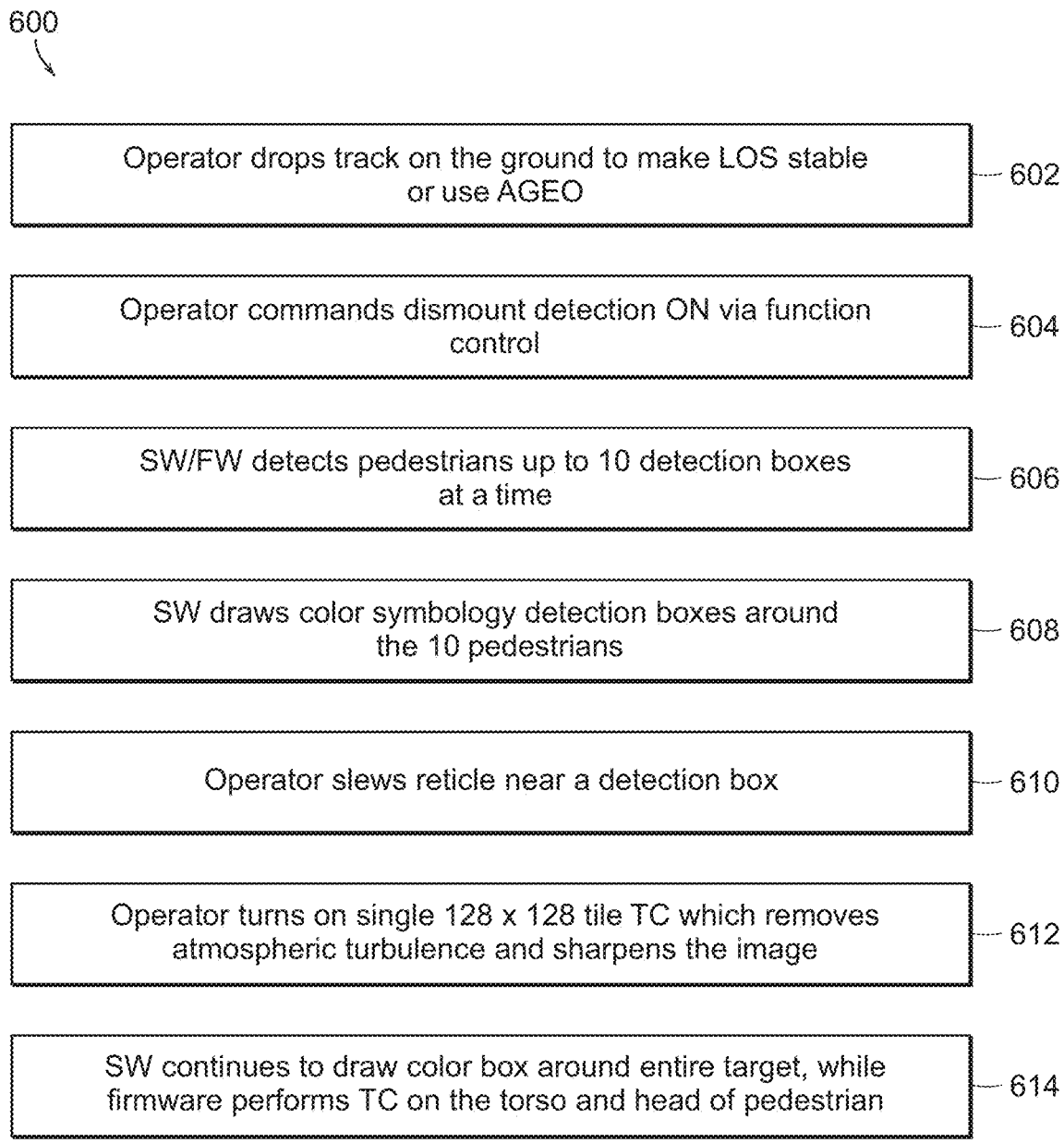
FIG. 6 is a system flow diagram associated with a system for image turbulence correction of moving targets.

Referring now to FIGS. 5-6, an example system for image turbulence correction of moving targets is shown where walking pedestrians 502 are represented as detection targets. As such, an operator drops track on the ground to steady a line-of-sight or use an AGEO 602. Subsequently, an operator commands dismount detection ON via a function control 604, implemented via image acquisition unit 102 and ATR 400 system. The ATR 400 system software and/or firmware detects pedestrians 502 up to 10 detection boxes at a time 606, that is, 10 of the highest probability algorithmic matches. Software included within the ATR 400 draws color symbology detection boxes around the 10 pedestrians 608. The operator thereafter slews a reticle near a detection box 610. The operator turns on single 128×128 tile turbulence correction and full motion color turbulence correction described with reference to image processor 108, which removes atmospheric turbulence and sharpens the image 612. The software of the ATR 400 continues to draw color boxes around targets, while the firmware including the image processor 108 performs turbulence correction on the torso and head of the pedestrian 502.

Elements, equations, or steps of different implementations described may be combined to form other implementations not specifically set forth previously. Elements, equations, or steps may be left out of the systems or processes described previously without adversely affecting their operation or the operation of the system in general. Furthermore, various separate elements, equations, or steps may be combined into one or more individual elements or steps to perform the functions described in this specification. It should be understood by one skilled in the art that equations set forth herein may be otherwise expressed in a different form or manner with different underlying assumptions, thus not specifically set forth.

Other implementations not specifically described in this specification are also within the scope of the following claims.

What is claimed is:

1. A system for image turbulence correction of moving targets comprising:
    an automatic target recognizer (ATR) system including:
        a database arranged to store target recognition data including a plurality of reference features associated with each of a plurality of reference targets;
        a feature extractor and processor, in electrical communication with the database, arranged to: i) receive image frames associated with one or more acquired targets from an image acquisition system, ii) detect one of the presence, absence, or probability of one of the plurality of reference features associated with the one or more acquired targets within the image frames, and iii) calculate a position of the plurality of reference features associated with the one or more acquired targets within the image frames, wherein the image frames associated with one or more acquired targets include a plurality of consecutive chrominance frames, comprising a last chrominance frame and a plurality of preceding chrominance frames; and
    an image processor, in electrical communication with the ATR and the image acquisition unit, arranged to: i) receive image frames associated with one or more acquired targets from the image acquisition system; ii) receive the position of the plurality of reference features of the one or more acquired targets from the ATR; iii) demosaic the image frames into a plurality of video tiles; each video tile being associated with an acquired target iv) iteratively process the video tiles associated with the acquired targets of the image frames for turbulence correction to generate turbulence corrected video tiles associated with each of the acquired targets; v) convert turbulence corrected video tiles associated with each of the acquired targets into a single video frame tile associated with each acquired target including turbulence degradation correction; and vi) mosaic each of the single video frame tiles associated with each acquired target of the image frames to generate a full field of view turbulence corrected video stream, wherein the image processor is further arranged to:
        upsample each of the last chrominance frame and the preceding chrominance frames;

shift the preceding chrominance frames;
average the last chrominance frame and the preceding chrominance frames to form an average chrominance frame;
subsample the average chrominance frame to form a subsampled chrominance frame;
delay the subsampled chrominance frame; and
combine the delayed sub sampled chrominance frame with the enhanced luminance frame.

2. The system of claim 1, wherein the image processor is further arranged to normalize the turbulence corrected single video frame tiles by utilizing a linear relationship between a range of pixels in a first set of image statistics and a range of pixels in a second set of image statistics, as a gain term and an offset.

3. The system of claim 1, wherein the image processor is arranged to mosaic the single video frame tiles by cropping individual tiles and performing a weighted average calculation on three overlapping horizontal, vertical, and both-horizontal-and-vertical regions.

4. The system of claim 1, wherein the image frames associated with one or more acquired targets include a plurality of consecutive luminance frames, comprising a last frame and a plurality of preceding frames.

5. The system of claim 1, wherein the image frames associated with one or more acquired targets are generated based on at least one of synthetic aperture radar (SAR), inverse synthetic aperture radar (ISAR), laser detection and ranging (LADAR), infrared detection, optical based imagery, and hyperspectral radar data.

6. The system of claim 1, further comprising a video display arranged to display the turbulence corrected video stream.

7. The system of claim 1, wherein the plurality of reference features include the torso and head of a human.

8. The system of claim 1, wherein the image processor is further arranged to overlay the single video frame tile associated with each acquired target including turbulence degradation correction with image frames from the ATR.

9. A method for correcting image turbulence of moving targets comprising:
receiving image frames, by an image processor, associated with one or more acquired targets from an image acquisition system;
receiving image frames, by an automatic target recognizer (ATR) system, associated with one or more acquired targets from the image acquisition system, wherein the image frames associated with one or more acquired targets from the image acquisition system include a plurality of consecutive chrominance frames, comprising a last chrominance frame and a plurality of preceding chrominance frames;
detecting, with the ATR system, one of the presence, absence, or probability of one of a plurality of reference features associated with the one or more acquired targets within the image frames;
calculating, with the ATR system, a position of the plurality of reference features associated with the one or more acquired targets within the image frames;
receiving, by the image processor, the position of the plurality of reference features associated with the one or more acquired targets from the ATR system;
demosaicing, by the image processor, the image frames into a plurality of video tiles, each video tile being associated with an acquired target;
iteratively processing, by the image processor, the video tiles associated with the acquired targets of the image frames for turbulence correction to generate turbulence corrected video tiles associated with each of the acquired targets;
converting, by the image processor, turbulence corrected video tiles associated with each of the acquired targets into a single video frame tile associated with each acquired targeting including turbulence degradation correction; and
mosaicing, by the image processor, each of the single video frame tiles associated with each acquired target of the image frames to generate a full field of view turbulence corrected video stream, the method further comprising:
upsampling each of the last chrominance frame and the preceding chrominance frames;
shifting the preceding chrominance frames;
averaging the last chrominance frame and the preceding chrominance frames to form an average chrominance frame;
subsampling the average chrominance frame to form a subsampled chrominance frame;
delaying the subsampled chrominance frame; and
combining the delayed subsampled chrominance frame with the enhanced luminance frame.

10. The system of claim 9, further comprising overlaying the video frame tiles associated with each acquired target including turbulence degradation correction with image frames from the image acquisition system.

11. The method of claim 9, further comprising normalizing the turbulence corrected single video frame tiles by utilizing a linear relationship between a range of pixels in a first set of image statistics and a range of pixels in a second set of image statistics, as a gain term and an offset.

12. The method of claim 9, wherein mosaicing each of the single video frame tiles includes cropping individual tiles and performing a weighted average calculation on three overlapping horizontal, vertical, and both-horizontal-and-vertical regions.

13. The method of claim 9, wherein the image frames associated with one or more acquired targets from the image acquisition system include a plurality of consecutive luminance frames, comprising a last frame and a plurality of preceding frames.

14. The method of claim 9, wherein the image frames associated with one or more acquired targets are generated based on at least one of synthetic aperture radar (SAR), inverse synthetic aperture radar (ISAR), laser detection and ranging (LADAR), infrared detection, optical based imagery, and hyperspectral radar data.

15. The method of claim 9, further comprising displaying the turbulence corrected video stream on a video display.

16. The method of claim 9, wherein the plurality of reference features include the torso and head of a human.

* * * * *